US010460124B2

(12) United States Patent
Wright et al.

(10) Patent No.: US 10,460,124 B2
(45) Date of Patent: Oct. 29, 2019

(54) PER-VOLUME TENANT ENCRYPTION AND EXTERNAL KEY MANAGER

(71) Applicant: NETAPP, INC., Sunnyvale, CA (US)

(72) Inventors: David D. Wright, Dacula, GA (US); Daniel McCarthy, Erie, CO (US)

(73) Assignee: NetApp, Inc., Sunnyvale, CA (US)

( * ) Notice: Subject to any disclaimer, the term of this patent is extended or adjusted under 35 U.S.C. 154(b) by 177 days.

(21) Appl. No.: 15/186,787

(22) Filed: Jun. 20, 2016

(65) Prior Publication Data

US 2017/0364704 A1    Dec. 21, 2017

(51) Int. Cl.
*H04L 29/06* (2006.01)
*G06F 21/62* (2013.01)
*G06F 21/60* (2013.01)
*H04L 9/32* (2006.01)

(52) U.S. Cl.
CPC ........ *G06F 21/6227* (2013.01); *G06F 21/602* (2013.01); *H04L 9/3239* (2013.01); *H04L 2209/30* (2013.01)

(58) Field of Classification Search
CPC ..... G06F 21/6227; G06F 21/602; H04L 9/06; H04L 2209/30
USPC ........................................................ 713/165
See application file for complete search history.

(56) References Cited

U.S. PATENT DOCUMENTS

| 6,604,155 | B1 * | 8/2003 | Chong, Jr. | ............ G06F 3/0613 709/231 |
| 7,174,379 | B2 * | 2/2007 | Agarwal | ................. G06F 9/505 709/226 |
| 9,639,546 | B1 * | 5/2017 | Gorski | .............. G06F 17/30132 |
| 2004/0107281 | A1 * | 6/2004 | Bose | ....................... H04L 29/06 709/226 |
| 2004/0133622 | A1 * | 7/2004 | Clubb | ..................... G06F 9/505 709/200 |
| 2010/0031000 | A1 * | 2/2010 | Flynn | ................ G06F 17/30949 711/216 |
| 2010/0280998 | A1 * | 11/2010 | Goebel | ............... G06F 11/2094 707/652 |
| 2011/0213928 | A1 * | 9/2011 | Grube | ................. G06F 11/1076 711/114 |
| 2011/0238857 | A1 * | 9/2011 | Certain | ................. G06F 9/5044 709/232 |
| 2011/0311051 | A1 * | 12/2011 | Resch | ..................... H04L 63/06 380/270 |
| 2014/0129830 | A1 * | 5/2014 | Raudaschl | .......... G06F 21/6218 713/165 |

(Continued)

OTHER PUBLICATIONS

Jude Nelson; Syndicate: Building a Virtual Cloud Storage Service Through Service Composition; Princeton University; Year: 2013; p. 1-14.*

*Primary Examiner* — Monjur Rahim
(74) *Attorney, Agent, or Firm* — Cesari and McKenna, LLP

(57) ABSTRACT

A server node with one or more processors is configured to receive a request to write data to a storage medium and compress the data to yield compressed data. The one or more processors are further configured to encrypt the compressed data according to an encryption key to yield compressed and encrypted data. The one or more processors are further configured to hash the compressed and encrypted data to yield one or more block identifiers that uniquely represent the compressed and encrypted data.

19 Claims, 8 Drawing Sheets

(56) References Cited

U.S. PATENT DOCUMENTS

2015/0293817 A1* 10/2015 Subramanian .... G06F 17/30212
707/645

* cited by examiner

PER-VOLUME TENANT ENCRYPTION AND EXTERNAL KEY MANAGER

BACKGROUND

The following description is provided to assist the understanding of the reader. None of the information provided is admitted to be prior art.

A unit of data, such as a file or object, includes one or more storage units (e.g., blocks), and can be stored and retrieved from a storage medium. For example, disk drives in storage systems can be divided into logical blocks that are addressed using logical block addresses (LBAs). The disk drives use spinning disks where a read/write head is used to read/write data to/from the drive. It is desirable to store an entire file in a contiguous range of addresses on the spinning disk. For example, the file may be divided into blocks or extents of a fixed size. Each block of the file may be stored in a contiguous section of the spinning disk. The file is then accessed using an offset and length of the file. Other types of storage systems may also be used to store files or objects.

Storage mediums on which files and/or objects are stored may need to be changed to address changes in the files and/or objects that are stored. For example, if a user needs more storage space for files and/or objects, the storage medium's hardware may be expanded to include more memory for the storing of the additional or larger files and/or objects. Storage mediums may also be controlled by software that is subject to updates to keep the storage system running properly.

BRIEF DESCRIPTION OF THE DRAWINGS

The foregoing and other features of the present disclosure will become more fully apparent from the following description and appended claims, taken in conjunction with the accompanying drawings.

OVERVIEW

Figure 1:
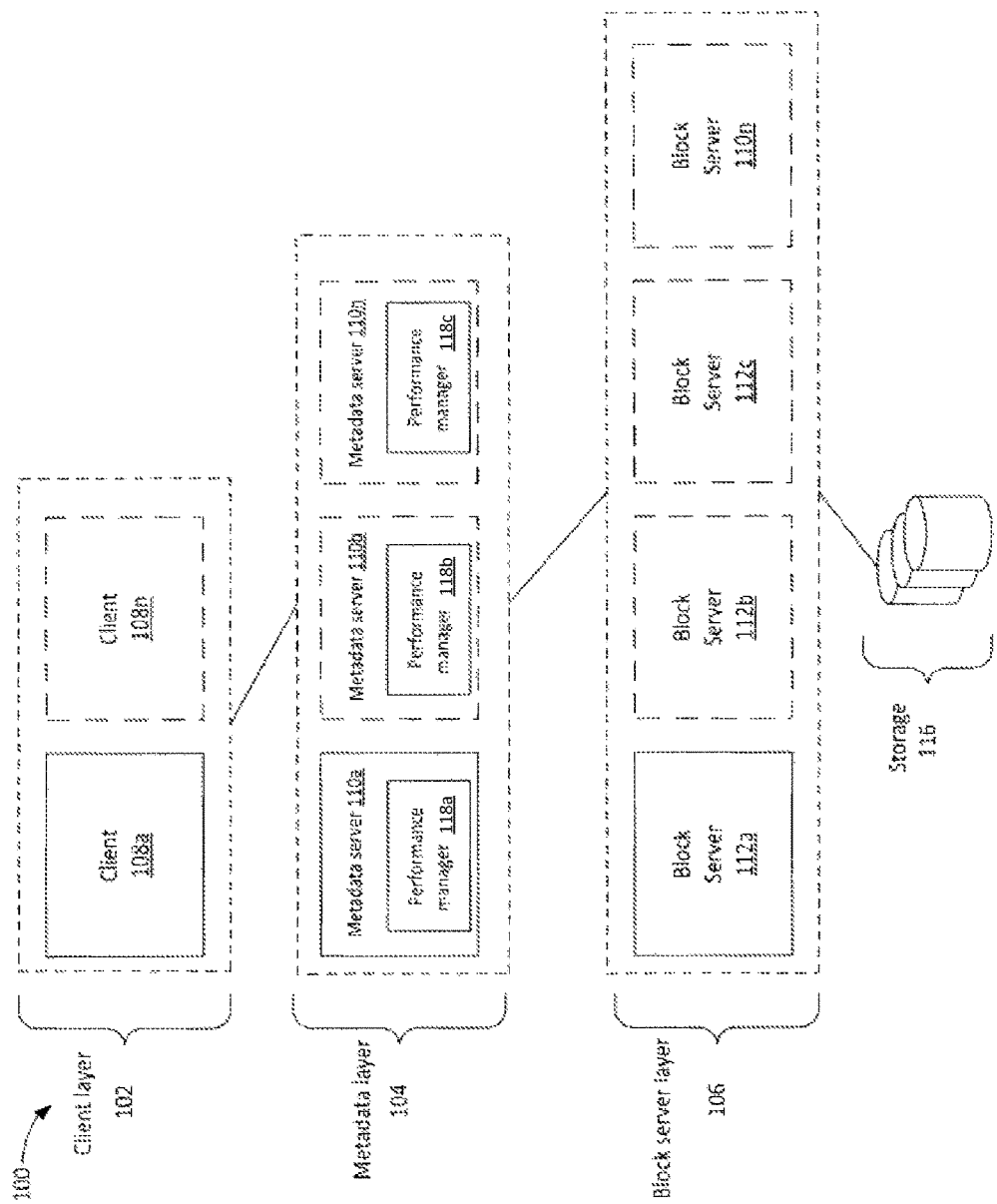
FIG. 1 depicts a simplified system for a storage system in accordance with an illustrative implementation.

In general, one aspect of the subject matter described in this specification can be embodied in a system that includes a server node comprising one or more processors configured to receive a request to write data to a storage medium and compress the data to yield compressed data. The one or more processors are further configured to encrypt the compressed data according to an encryption key to yield compressed and encrypted data. The one or more processors are further configured to hash the compressed and encrypted data to yield one or more block identifiers that uniquely represent the compressed and encrypted data.

Another aspect of the subject matter described in this specification can be embodied in methods of writing data at a server node including receiving a request to write data to a storage medium and compressing the data to yield compressed data. The method further includes encrypting the compressed data according to an encryption key to yield compressed and encrypted data. The method further includes hashing the compressed and encrypted data to yield one or more block identifiers that uniquely represent the compressed and encrypted data Another aspect of the subject matter described in this specification can be embodied in a non-transitory computer-readable medium having instructions stored thereon, that when executed by a computing device cause the computing device to perform operations including receiving a request to write data to a storage medium and compressing the data to yield compressed data. The operations further include encrypting the compressed data according to an encryption key to yield compressed and encrypted data. The operations further include hashing the compressed and encrypted data to yield one or more block identifiers that uniquely represent the compressed and encrypted data.

Another aspect of the subject matter described in this specification can be embodied in methods of reading data at a server node including receiving a request to read encrypted and compressed data stored on a storage medium. The method further includes determining, based on the request, one or more block identifiers that uniquely represent the compressed and encrypted data. The one or more block identifiers indicate address of the encrypted and compressed data on the storage medium. The method further includes decrypting the encrypted and compressed data according to an encryption key to yield compressed data. The method further includes decompressing the compressed data to yield data.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for an per-volume tenant encryption and external encryption key managers. The encryption methods and systems disclosed herein allow for encrypting data in such a way that multiple customers and clients/tenants (the terms clients and tenants are used herein interchangeably) of those customers can store information on a server system without utilizing the same encryption keys. In other words, according to the embodiments disclosed herein, different clients/tenants and groups of clients/tenants in the system may utilize different encryption keys in order to better secure the data stored by those clients/tenants. The systems and methods disclosed herein further provide for encryption of data that goes beyond merely encryption at rest. In other words, the systems and methods herein provide for data to be encrypted more than if data is only encrypted at persistent media such as disk drives, solid state drives (SSDs), etc. Advantageously, for at least some of the processes and methods disclosed herein when data stored is not at rest, the data may still be encrypted according to an appropriate encryption key allowing for added security of the data during these processes and methods and any other accompanying transmitting of that encrypted data. Additionally, the methods and systems herein provide for various schemes for storing, managing, and using various encryption keys for different users (i.e., a key manager). Also disclosed herein are systems and methods for tweaking data in order to introduce variability in the data, further anonymizing the data and protecting from any breach in security. Data can also be compressed to save space on persistent media where the data may be stored. Advantageously, the systems and methods disclosed herein implement the tweaking and compression of data along with the encryption features to create a versatile server system that is highly customizable and secure. Additionally, the server system disclosed herein can utilize the encryption, tweaking, and compression of data in ways that still allow the server system to perform other beneficial functions, such as backing up servers, de-duplicating, garbage clean up, and zero detection. Advantageously, the systems and methods disclosed herein may be applied to various server systems, including systems with different types of memory (e.g., solid state, flash, spinning disk drives, etc.). In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

FIG. 1 depicts a storage system 100 in accordance with an illustrative implementation. The system 100 shows just one example system on which per-volume tenant encryption and external key manager systems and methods might be executed. Other storage systems which utilize such encryptions and key managers are contemplated. The system 100 includes a client layer 102, a metadata layer 104, a block server layer 106, and storage 116.

In general, the client layer 102 includes one or more clients/tenants 108a-108n. The clients/tenants 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. clients/tenants 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol.

Metadata layer 104 includes one or more metadata servers 110a-110n. Performance managers 118 may be located on metadata servers 110a-110n. Block server layer 106 includes one or more block servers 112a-112n. Block servers 112a-112n are coupled to storage 116, which stores volume data for clients/tenants 108. Each client/tenant 108 (hereinafter "client 108") may be associated with a volume on one more of the metadata servers 110a-110n. In one implementation, only one client 108 accesses data in a volume; however, in another embodiment, multiple clients 108 may access data in a single volume. For example, a customer associated with multiple clients/users may utilize the systems and methods disclosed herein. That customer may, for example, be a large company that has numerous clients using the systems and methods disclosed herein. In such an embodiment, there may be data on a cluster that is designated to be accessible (readable) to all clients, some clients, one client, and/or no clients of the customer. Similarly, all/some/one/none of the clients associated with the customer may be able to write (including re-write, edit, delete, etc.) data on a cluster. In this way, security/access for data stored on the systems and methods disclosed herein may be properly regulated and apportioned. In particular, different volumes stored on the system 100 can be associated with one client or a set of multiple clients. Such clients may be associated with a particular customer. As will be described below, different volumes may be associated with different encryption schemes. In this way, volume(s) associated with a first client or set of clients may be encrypted according to a different encryption scheme than volume(s) associated with a second client or set of clients.

Storage 116 can include multiple solid state drives (SSDs). In one implementation, storage 116 can be a cluster of individual drives or nodes coupled together via a network. When the term "cluster" is used, it will be recognized that cluster may represent a storage system that includes multiple disks or drives that may or may not be networked together. Further, as used herein, a "cluster server" is used to refer to a cluster of individual storage drives that are associated with the block server layer 106 and the metadata layer 104. For example, a first the storage 116 is depicted in the system 100 as being associated with the metadata servers 110a-110n, and the block servers 112a-112n. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation. However, other memory types such as spinning disks may be used according to some embodiments. In some systems, data is encrypted at SSD or other storage, such that stored data is protected against unauthorized read/writes. As a result, the encryption key may also be stored on the storage 116. However, in such an embodiment, the same encryption key may be used for different clients, customers, and/or volumes, reducing potential security of the system. Additionally, an encryption key for stored data that is stored and used at the storage or block server layer 106 may have to be used even after a client no longer uses a server node. That is, by encrypting at the block server layer 106/storage 116 level, the encrypting is dissociated from the metadata layer 104 that has knowledge of clients (volumes) and block indicators (that point to the clients actual data) that could be used to encrypt on a per-volume tenant basis. In such a system, the metadata layer 104 would be dealing with unencrypted data that is decrypted by the block server layer 106 before being sent to/read by the metadata layer 104. By executing encryption at the metadata layer as disclosed herein, the system can also perform a greater proportion of its functions using encrypted data, which leads to a more secure use and storage of clients' data. Accordingly, disclosed herein are systems and methods for dissociating the encryption process form the client end user where data is very random as well as the persistent media (i.e. storage 116).

The system 100 may be made up of various server nodes. Server nodes may include any of the metadata layer 104, the block server layer 106, and/or the storage 116. The server nodes can be added or taken away from the system 100 to increase or decrease capacity, functionality, etc. of the system 100. Server nodes of the system 100 are controlled by software stored thereon. For example, the server nodes of the system 100 may use an operating system such as Linux. Server nodes may be updated with new software periodically. Server nodes may also be added to the system 100 and may be subject to an upgrade or downgrade in software to match the operating system controlling other server nodes already existing in the system 100. By utilizing the encryption/decryption processes disclosed herein, any encryption keys or processes may be updated by updating the metadata layer 104, without the storage 116 and/or the block server layer 106 being affected.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster. As will be disclosed further herein, the hash of the content may also be applied to data that has already been compressed, tweaked, and encrypted. In this way, the block identifier applies/refers to data after it has already been processed as disclosed herein so that the storage layer 106 and/or storage 116 is virtually indifferent whether data stored thereon is encrypted or not.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 maintain a mapping between a block identifier and the location of the data block in a storage medium 116 of block server 112. A volume maintained at the metadata layer 104 includes these unique and uniformly random identifiers, and so a volume's data is also evenly distributed throughout the storage 116 of the cluster. As disclosed herein, the metadata layer 104 can also include encryption keys and/or tweak value information associated with various volumes.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). Entities in system 100 may be virtualized entities. For example, multiple virtual block servers 112 may be included on a machine. Entities may also be included in a cluster, where computing resources of the cluster are virtualized such that the computing resources appear as a single entity. All or some aspects of the system 100 may also be included in one or more server nodes as disclosed herein.

Figure 2:
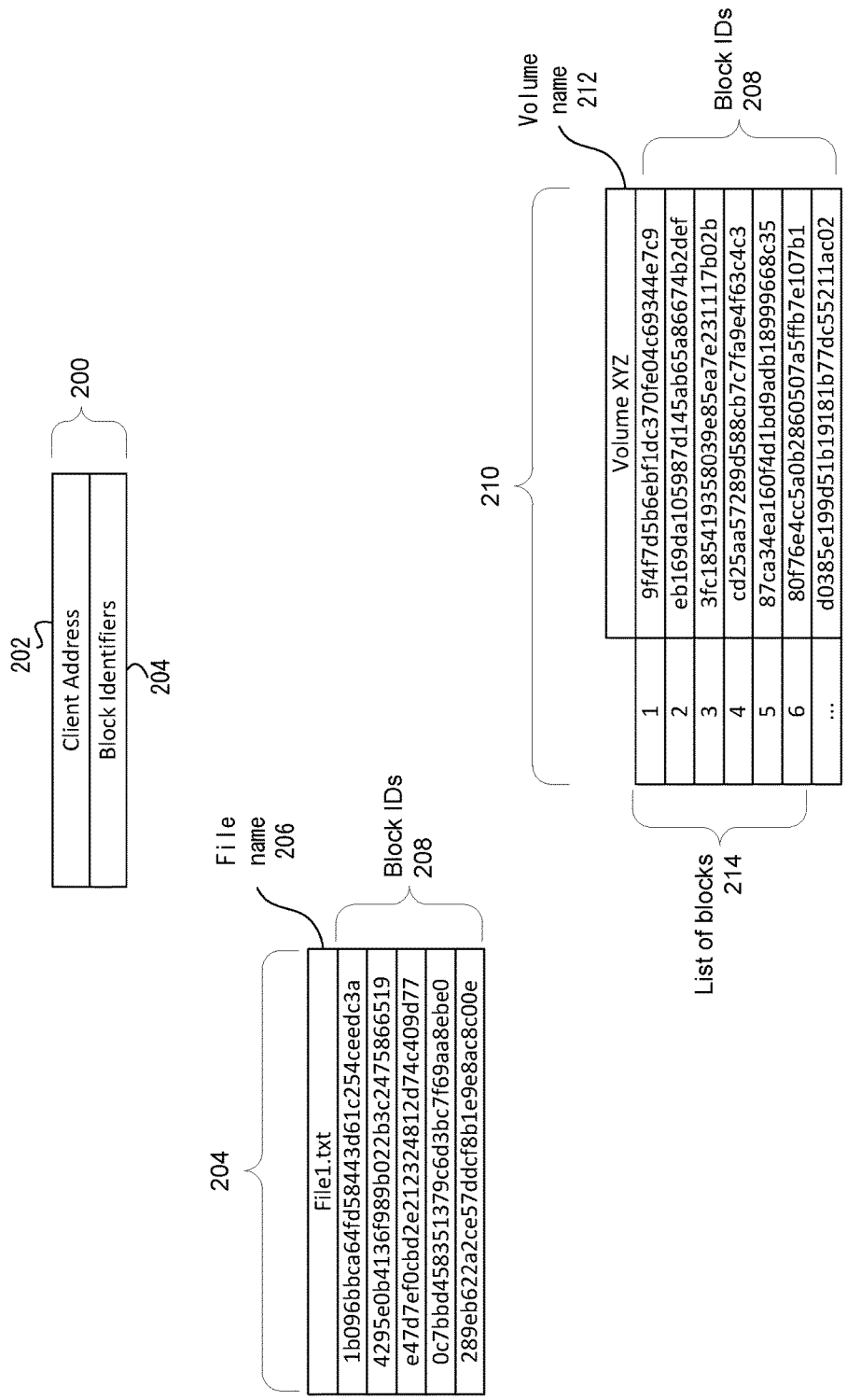
FIG. 2 depicts an example of metadata in accordance with an illustrative implementation.

FIG. 2 depicts an example of metadata according to one embodiment. At 200, the metadata includes a client address 202 and block identifiers 204. Client address 202 is the address referenced by client to perform access to data. For example, when clients want to read, write, or delete data, the client address for that data is used. The client address references the address in which client 102 thinks the data is stored in block server layer 106. The client address may use different formats. For example, client address 202 may reference a particular volume or partition, and a file name. With object storage, client address 202 may be a unique object name. For block storage, client address 202 may include a volume or partition, and a block address.

At 204, an example of metadata for file-oriented storage is shown. A file name 206 is the name of a file. A list of block identifiers 208 is then associated with file name 206. The block identifiers may be hexadecimal numbers, but other representations may be used. Additional metadata may also be included, such as inode numbers, directory pointers, modification dates, file size, etc. Block identifiers are identifiers that uniquely identify the data of the file. For example, each block identifier uniquely identifies a data block in the file.

At 210, metadata for a block-based system is shown. A volume name 212 is the name of the volume. A list of blocks 214 identifies blocks in the volume using block addresses. Also, a list of block identifiers 208 is associated with the lists of blocks 214. The client address in this case may be a volume name 212 and one or more block addresses in lists of blocks 214. Some systems may use a combination of block-based and file-oriented storage.

Figure 3:
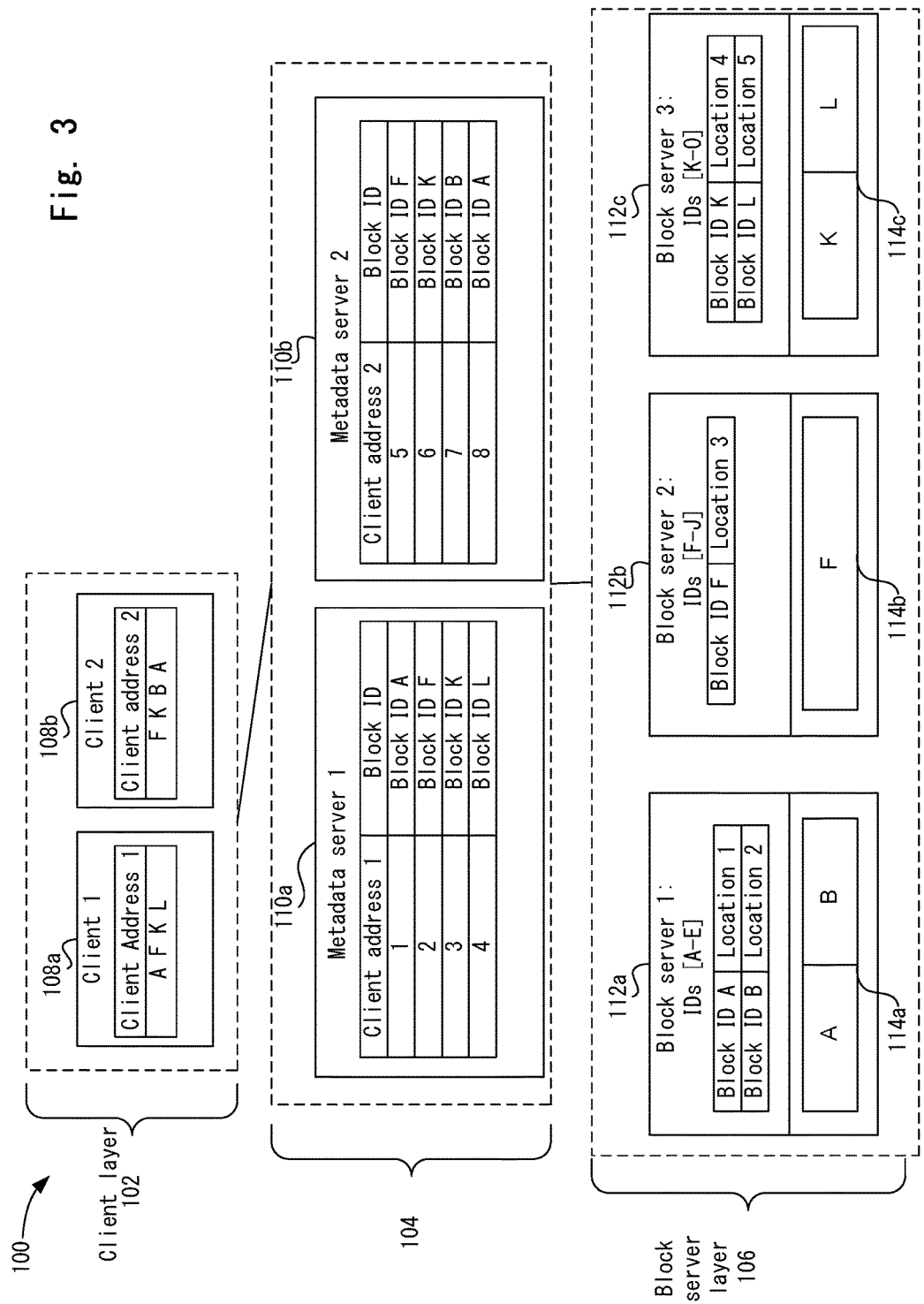
FIG. 3 depicts a more detailed example of a storage system in accordance with an illustrative implementation.

FIG. 3 depicts a more detailed example of system 100 according to one embodiment. FIG. 3 shows how data is stored in system 100. A client 108a (client 1) and a client 108b (client 2) may both wish to read and/or write data. For example, client 1 may wish to write data to a volume at a client address 1. For example, client address 1 may be a target name of the volume and a list of block identifiers (logical block addresses or LBAs). The data that client 1 wishes to write includes data blocks A F, K, and L.

Client 2 may wish to write data at client address 2. For example, client address 2 may reference a different volume than client address 1 and a different list of block identifiers. Other formats of client addressing may also be used. For discussion purposes, client address 1 and client address 2 are used to reference the respective data blocks and data block identifiers. The data that client 2 wishes to write may include data blocks F, K, B, and A. Accordingly, data blocks A, F, and K are duplicates between the data that client 1 and client 2 wish to write.

Metadata layer 104 is shown as including metadata server 110a (metadata server 1) and metadata server 110b (metadata server 2). Different metadata servers may be associated with different client addresses. For example, different metadata servers 110 may manage different volumes of data. In this example, metadata server 1 is designated as handling client address 1 and metadata server 2 is designated as handling client address 2.

For each client address, a list of block identifiers is stored. The block identifiers represent data blocks associated with the client address. For example, for client address 1, the block identifiers of block ID A, block ID F, block ID K, and block ID L are stored and associated with client address 1. Each block identifier is associated with a block of data. Similarly, in metadata server 2, client address 2 is associated with block IDs F, K, B, and A.

Block server layer 106 includes block servers 112a, 112b, and 112c (block servers 1, 2, 3, respectively). In one embodiment, block servers 112 are assigned to different ranges of block identifiers. For example, block server 1 is assigned to store data for block identifiers A-E, block server 2 stores data for block identifiers F-J, and block server 3 stores data for block identifiers K-O. In this case, data for a client address may not be stored in sequential locations on a storage medium in a single block server 112. Rather, the data is stored based on the block identifier determined for data. Further, as disclosed herein, the data can be encrypted/decrypted at the metadata layer 104.

Block server 1 stores data for block identifier A and block identifier B. Block server 1 maintains a mapping between the block identifier and the location on the storage medium where the data associated with block identifier A is stored. For example, block identifier A is mapped to a location 1 where data for block identifier A is stored on block server 1 and block identifier B is mapped to a location 2 where data for block identifier B is stored on block server 1. Also, block server 2 stores data for block identifier F in location 3 on block server 2, and block server 3 stores data for block identifiers K and L in locations 4 and 5, respectively, in block server 3.

Particular embodiments allow for the real time de-duplication of data. For example, client address 1 is associated with data for blocks A, F, K, and L and client address 2 is associated with data for blocks F, K, B, and A. Blocks A, B, and K are duplicated across client address 1 and client address 2 . Although not shown in this example, de-duplication may also occur within data for a single client address. Instead of storing two copies of blocks A, B, and K, block server 1 stores one copy each of data block A and data block B. Also, block server 3 stores one copy of data block K. Thus, duplicate blocks A, B, and K are not stored in block servers 112. This may efficiently use data storage on block servers 112. Using the above scheme, the blocks for a client address may not be stored in sequential locations on a storage medium 114. For example, for client address 1, block A is stored on block server 1 in storage medium 114a, block F is stored on block server 2 in storage medium 114b, and blocks K and L are stored on block server 3 in storage medium 114c. The storage mediums 114 are another way of configuring/representing the storage 116 of FIG. 1 described above.

In one embodiment, storage medium 114 in block server 112 may be a solid state device, such as non-volatile memory (e.g., flash memory). The solid state device may be electrically programmed and erased. The data blocks may be stored on the solid state device and persist when block server 112 is powered off. Solid state devices allow random access to data in an efficient manner and include no physical moving parts. For example, the random access is more efficient using solid state devices than if a spinning disk is used. Thus, data stored in data blocks for a client address in a non-contiguous address space and even different block servers 112 may still be accessed efficiently.

In one embodiment, storage medium 114 may include multiple solid state drives (e.g., flash memory drives). Each drive may store data for a portion of the block identifiers. Although a solid state device is described, it will be understood that spinning disks may also be used with particular embodiments.

Particular embodiments may perform reading, writing, and deleting of data. The following will describe each process separately.

Write Requests

Figures 4A, 4B:
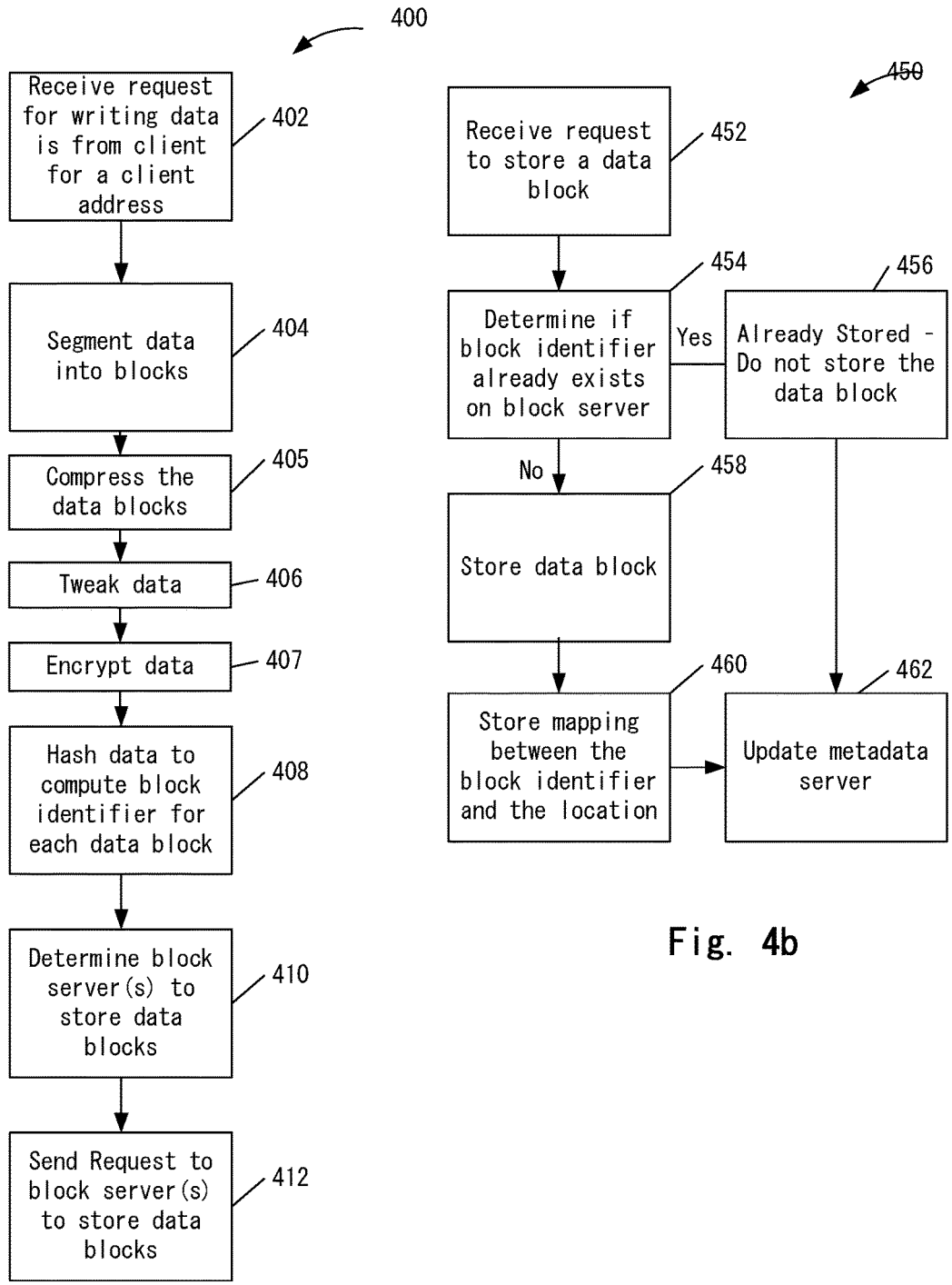
FIG. 4a depicts a flow diagram of a method for processing a write request at a metadata server in accordance with an illustrative implementation.
FIG. 4b depicts a flow diagram of a method for processing a write request at a block server in accordance with an illustrative implementation.

FIG. 4a depicts a simplified flowchart 400 of a method for writing data at, for example, metadata server 110 according to one embodiment. In alternative embodiments, fewer, additional, and/or different steps may be performed. Also, the use of a flow diagram is not meant to be limiting with respect to the order of steps performed. At an operation 402, a request to write data to a storage medium such as storage 116 is received from client 108 for a client address. The request may not explicitly specify the storage 116, as the metadata server 110 would determine where the data is physically stored. At an operation 404, metadata server 110 segments the data into blocks. At an operation 405, metadata server 110 compresses the data blocks so that the data may take up less memory/persistent media when stored/written. This yields compressed data blocks. Optionally, before the operation 405, the system may determine whether the data comprises all zero values. This may be referred to herein as zero detection. In other words, the system may determine whether the data includes at least one non-zero value. If the data does have at least one non-zero value (i.e., the data is not all zeroes, the system may proceed to an operation 406 as described below. If the system does not have at least one non-zero value (i.e., the data is all zeroes), the system can modify metadata for the block identifiers to a marker that indicates that the block is all zeroes. In other words, the metadata mapping the blocks to the client address in the metadata layer 104 will indicate that the block is all zeroes. In this way, a metadata server 110 does not have to, in the future, actually call the data from the blocks as the metadata indicates what the data in the blocks is. Further, when an all zero block is included in the write request in this way, the system does not need to ensure that the block itself is zeroed out based on the write request, because the metadata is enough to indicate the data contained in the block(s) (i.e., all zeroes). This is valuable because a persistent media may have a useful life that is shortened every time data is written and or read to it. By storing a marker that a block is all zeroes without actually writing the zeroes into the block, the useful life of the persistent media may be extended by avoiding additional reads and writes.

At an operation 406, after the metadata server 110 compresses the data blocks, the metadata server 110 tweaks the compressed data blocks according to a tweak value before encrypting the compressed data. Tweaking the data introduces variability to data to provide enhanced protection and anonymity once the data is encrypted. For example, if two clients were to write the same data block to a server, the data blocks may look identical if the same encryption key is used to encrypt the data. Thus, an unauthorized read of the encrypted data blocks may reveal that the two clients are storing a common data block, even if the unauthorized read could decrypt the data blocks themselves. By introducing a tweak before encryption, the data blocks will look different before and after encryption so that any unauthorized reads would not be able to identify the common data blocks without knowing the tweak values for each data block as well as the encryption key. As disclosed herein, different tweak values may be used according to different clients, customers, volumes, server nodes, block servers. Additionally, the operation 406 may be omitted from the process (i.e., tweak value is zero). As further discussed below with respect to de-dupability, how tweaking and different tweak values are applied may be customized to maximize security while limiting the ability to de-dupe (use more and/or more complicated tweak values), or may maximize de-dupability while limiting security to some extent (using fewer, none, and/or less complex tweak values).

The tweak values may be set and stored according to various schemes the have varying effects. As a first example, all tweak values may be set to zero, so that no tweaking takes place. This example leads to maximum de-dupability, as disclosed herein. In this example, encrypted identical data blocks from different clients will look the same because they have not been tweaked differently (presuming they are using the same encryption key or that no encryption is taking place). Therefore, the system will be able to recognize the encrypted identical data blocks in block server storage and be able to de-dupe them regardless of what clients and/or customers the data blocks are associated with. In another example, tweak values may be set according to clients and/or customers. That is, at least some different clients and/or customers may have different tweak values (which can include some clients/customers with a zero tweak value). Such a scheme increases security because identical encrypted data of different clients/customers will not appear identical due to different tweak values. In other words, the tweak value can be at least in part dependent on or associated with a client address from which read or write requests are received. In another example, the tweak value can be at least in part dependent on or associated with a customer having a plurality of client addresses from read or write requests are received (i.e., tweak value applies to multiple clients of the same customer). However, this comes at a cost of limiting de-dupability. Here, de-duping may only be possible on a client/customer wide level rather than a system wide level. In other words, only identical data blocks that have been tweaked according to the same tweak value (and encrypted according to the same encryption key as disclosed herein) may be de-duped. This is example may be stated another way as tying a tweak value to a particular volume in the metadata server 110. In such an example, the tweak value or scheme for tweaking may be stored in the metadata server 110 itself. In this way, de-duping across particular volumes is possible. In another embodiment, the tweak value may be associated with a storage medium of the block server (i.e., a data block may have a different tweak value depending on which block server 112 it will be stored in).

Other tweak value schemes are also contemplated herein. Rules for the tweak values may be set so that memory for storing tweak values need not be used. That is, a tweak value can be calculated rather than a set value. For example, the tweak value could be calculated according to a logical block address (LBA) of a data block (which can correspond to the location of the data in the storage medium). This allows for some de-dupability (again assuming the same encryption key is used) if an identical data block is stored on another block server at the same location/LBA. In another example, the tweak value may be calculated based on both the LBA and a volume identification (i.e., a client address or identification for a volume associated with a client/customer). For example, the tweak value may be determined by performing an XOR function on the volume identification and the LBA. This example yields maximum security as there should be no identical data block after tweaking and encryption (even if encryption key is the same for various clients because different clients would be associated with different volume identifications), but offers little in the way of de-dupability because any identical data blocks written by different clients associated with different volume identifications would still be tweaked with different tweak values.

The tweak value schemes in the preceding paragraphs may be customized for different customers/clients to maximize de-dupability, security, or to get some of both. A server system can accommodate these choices so that any customer/client is best served based on their needs, constraints, security concerns, etc.

At an operation 407, the metadata server 110 encrypts the compressed data according to an encryption key to yield compressed and encrypted data. The compression at the operation 405 may occur prior to the encryption at the operation 407 because an encryption randomizes the data, which may severely limit the advantages of compressing data. As discussed herein, the metadata server 110 performs the encryption to provide better options for securing the data when it is in transit, as well as when it is read, re-written, or duplicated/backed up in the future. Additionally, as discussed herein, encrypting at the metadata server 110 provides additional flexibility for the management of encryption keys, allowing encryption keys to be assigned and stored in a variety of ways. In some embodiments, metadata server 110 may have one or more processors that are different or separate from processors of the block servers 112. In this way, the encryption can be done at the metadata server 110 and not the storage level that may be considered data at rest.

Like the tweak values and/or rules discussed above, encryption keys may also be stored in various locations and configured in various ways to yield various desired results with respect to security and other functions such as de-dupability, redundancy, and/or deletions. For example, an encryption key may be customer specific, client/tenant specific (where a customer is defined herein as having multiple clients/tenants), volume specific, or global/system wide. Some systems may use a combination of such schemes. Accordingly, as part of encrypting data the encryption key to use needs to be determined. Metadata can be accessed to determine which encryption key will be used for encrypting the data. In addition, the customer accessing the data, the volume the data will be written, a user access the data, etc., can be used to determine which encryption key to use to encrypt the data.

At an operation 408, metadata server 110 hashes the compressed and encrypted data blocks to compute a block identifier for each data block. Such hashing yields block identifiers that uniquely represent the compressed and encrypted data. In one embodiment, a unique block identifier is determined for each data block. For example, a cryptographic hash, such as a secure hash algorithm (SHA)-1, SHA-256, or message-digest algorithm 5 (MD-5), over the data block may be used. The hash value (or a variant of a computed hash value) is then used as the block identifier.

At an operation 410, metadata server 110 determines one or more block servers in which to store the data blocks. To determine which block servers 112 to use, a mapping between the block identifier and a list of block servers 112 is determined. As discussed above, different block servers 112 service different ranges of block identifiers. Different methods may be used to map between block identifiers and block servers 112, such as a table that maps each range of block identifiers to one or more block servers 112, consistent hashing, or a straight hash of the identifier. According to the method used to map between block identifiers and block servers 112, the block identifiers are stored as metadata in the metadata servers to map the data to at least one client address, such as the client address from which the write request was received, so that the metadata and block servers can read, retrieve, write, etc. the compressed and encrypted data in future.

At an operation 412, the block servers 112 are sent a request to store the compressed and encrypted data block(s) from the metadata server 110. For example, different block servers associated with the different block identifiers are sent different requests.

FIG. 4b depicts a simplified flowchart 450 for processing a write request at a block server 112 according to one embodiment. In alternative embodiments, fewer, additional, and/or different steps may be performed. Also, the use of a flow diagram is not meant to be limiting with respect to the order of steps performed. At an operation 452, block server 112 receives the request to store a data block. The method will be described with respect to one block server 112; however, it will be understood that multiple block servers 112 may receive different write requests for different block identifiers.

At an operation 454, block server 112 determines if the block identifier already exists on the block server. The block server may check a list of block identifiers for the one or more block identifiers that uniquely represent the compressed and encrypted data. For example, if the data block identified by the block identifier is already stored on block server 112, block server 112 may already have stored a mapping between the block identifier and a location on a storage medium 114. In an alternative embodiment, the system may also check for the block identifier in metadata stored on the metadata server 110 (the metadata may include a list of block identifiers that uniquely represent the compressed and encrypted data stored on the block servers 112). If the metadata server 110 indicates that the data block is already stored on the block servers 112, the system may not send the request to the block server to store the data block in the operation 412. However, in some embodiments, even if the block identifier is not in the metadata, the data block may still be stored in the block servers 112 because it is stored by a different client (and is therefore associated with the metadata or volume on a different metadata server 110 than the one that processed the write request in the operation 400). Thus, if a data block is not found in the metadata on the metadata server 110, the data block may still exist on one of the block servers 112.

At an operation 456, if the data block is already stored, then the data block is not stored again. Some other data may need to be updated if the data block has already been stored. For example, an "in use" flag may be set for use during data deletion, which will be described later. Additionally, as disclosed herein, metadata on the metadata server 110 may be updated to properly map a client to the data block.

If the data block does not exist, then at an operation 458, the data block is stored in a location by block server 112. In some embodiments, the block server can encrypt the data as part of storing the data. In these embodiments, the data is encrypted two separate times. At an operation 460, a mapping between the block identifier and the location is stored.

At an operation 462, block server 112 updates metadata server 110 to indicate the data block was already stored or the data block was just stored. Also, metadata server 110 may insert a mapping between the client address and the block ID upon receiving the indication.

Referring to FIG. 3, the write process will be described. In one example, client 108a may wish to write data to client address 1. Data blocks A, F, K, and L are received at metadata server 110a (or 110b). The data blocks are compressed, tweaked, encrypted, and hashed to determine a hash value for each data block. Metadata server 110a then determines which block servers 112 are assigned to service the write request based on the block identifiers. In this case, data block A is sent to block server 112*a*, data block F is sent to block server 112*b*, and data blocks K and L are sent to block server 112*c*. Once each block server 112 stores the respective block(s), confirmation is received at metadata server 110*a* and the block identifiers are stored with client address 1.

Client 108*b* may then wish to write data to client address 2. Data blocks F, K, B, and A are received at metadata server 110*a* (or 110*b*). The data blocks are compressed, tweaked, encrypted, and hashed to determine a hash value for each data block. Metadata server 110*a* then determines data blocks A and B are sent to block server 112*a*, data block F is sent to block server 112*b*, and data block K is sent to block server 112*c*. Block server 112*a* determines that data block A exists on storage medium 114*a* and thus does not need to be stored again. However, data block B is not located on storage medium 114*a* and is stored. Confirmation that data blocks A and B have been stored is sent to metadata server 110*a*. Block server 112*b* determines that data block F has already been stored and thus does not store data block F again. Confirmation that data block F has been stored is sent to metadata server 110*a*. Block server 112*c* determines that data block K has already been stored and thus does not store data block K again. Confirmation that data block K has been stored is sent to metadata server 110*a*. Once each block server 112 stores the respective block(s), metadata server 110*a* stores the block identifiers with client address 2.

Read Requests

Figure 5A:
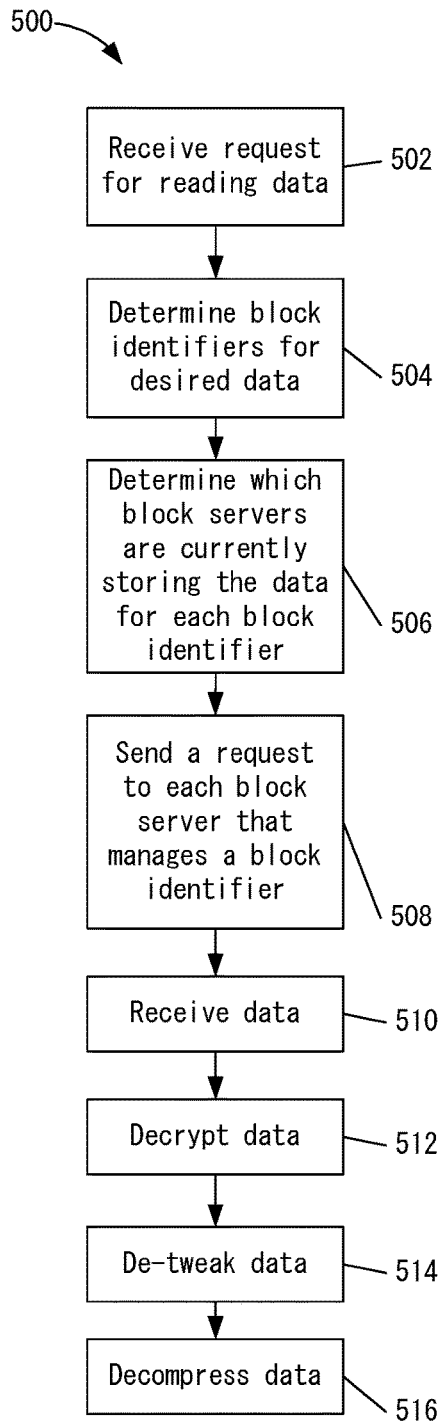
FIG. 5a depicts a flow diagram of a method for processing a read request at a metadata server in accordance with an illustrative implementation.

A read request will now be described. FIG. 5*a* depicts a simplified flowchart 500 of a method for processing a read request at metadata server 110 according to one embodiment. In alternative embodiments, fewer, additional, and/or different steps may be performed. Also, the use of a flow diagram is not meant to be limiting with respect to the order of steps performed. At an operation 502, a request for reading encrypted and compressed data at a client address and stored on a storage medium is received from client 108 at metadata server 110. The request may reference a client address, but not specific block servers 112. This is because metadata layer 104 is abstracting block server layer 106 from client layer 102. In this case, client 108 may assume that data has been stored with respect to the client address in a sequential manner in block server layer 106.

At an operation 504, metadata server 110 determines block identifiers for the requested data. The block identifiers, as disclosed herein, uniquely represent compressed and encrypted data stored on a block server and indicate an address of the encrypted and compressed data on the storage medium of the block server. For example, metadata server 110 may look up a mapping of the client address to block identifiers in stored metadata.

At an operation 506, metadata server 110 determines which block servers 112 are currently storing the data for each block identifier. As discussed above, data for different block identifiers may be stored on different block servers 112 that service different ranges of block identifiers. Metadata server 110 determines the different block servers 112 based on the ranges of block identifiers determined. At an operation 508, metadata server 110 sends a request to each block server 112 that manages a block identifier.

At an operation 510, the metadata server 110 receives the compressed and encrypted data from the block server 112. At an operation 512, the metadata server 110 decrypts the encrypted and compressed data according to an encryption key to yield compressed data. The encryption key to use can be determined similar to the determination of the encryption key to use during writing data. At an operation 514, the metadata server 110 de-tweaks the compressed data before the compressed data is decompressed. As part of the operation 514, the metadata server 110 may also determine the tweak value for de-tweaking the compressed data. The tweak value may be determined according to rules or stored values according to various tweak schemes as disclosed herein. At an operation 516, decompressing the compressed data to yield data. The data that was originally requested to be read can then be read, as well as sent to a client or for any other use for which decompressed, de-tweaked, and decrypted data was desired.

Figure 5B:
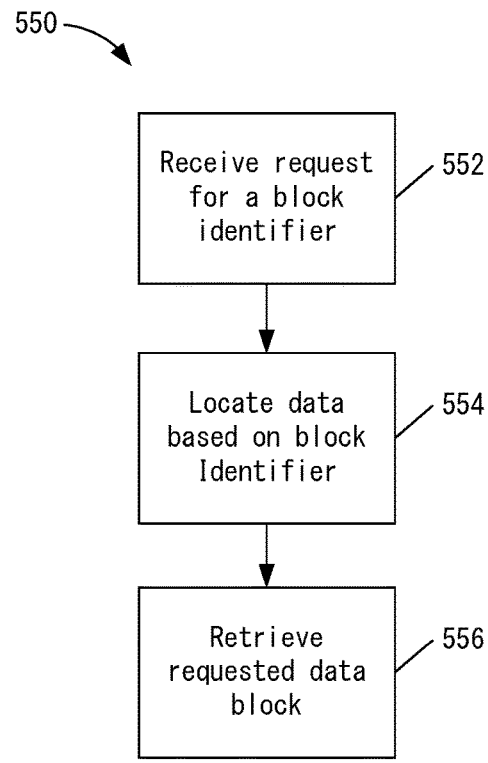
FIG. 5b depicts a flow diagram of a method for processing a read request at a block server in accordance with an illustrative implementation.

FIG. 5*b* depicts a simplified flowchart 550 of a method for processing a read request at a block server 112 according to one embodiment. In alternative embodiments, fewer, additional, and/or different steps may be performed. Also, the use of a flow diagram is not meant to be limiting with respect to the order of steps performed. The method is described with respect to a single block server 112; however, the method may be applied to all block servers 112 that are sent requests.

At an operation 552, block server 112 receives a request for an encrypted data block identifier. At 554, block server 112 locates the requested encrypted data block based on the block identifier. For example, block server 112 may access a mapping between the block identifier and the location of the stored encrypted block data. Different methods may be used to access the location, such as an on-disk hash table or tree, an in-memory hash table or tree, a sorted list of data blocks, or a database of block identifiers.

At an operation 556, once the encrypted data block is located, block server 112 retrieves the requested encrypted data block. In one embodiment, block server 112 may return the encrypted data block to the metadata server 110 that requested the encrypted data block so that the data block can be decrypted as disclosed herein.

Referring to FIG. 3, in one example, client 108*a* may wish to read data from client address 1. A read request for client address 1 is received at metadata server 110*a* (or 110*b*). Because of the de-duplication of data, the data blocks A, F, K, and L may not have been stored on a contiguous address space for client address 1. Metadata server 110*a* determines the block identifiers for the data blocks. The associated block servers 112 for the block identifiers are then determined. A read request is then sent to the determined block servers 112. For example, block server 112*a* is sent a read request for data block A, block server 112*b* is sent a read request for data block F, and block server 112*c* is sent a read request for data blocks K and L. Block servers 112*a-c* retrieve the data blocks based on the block identifiers and send the data blocks to metadata server 110*a*. Metadata server 110*a* then sends the data blocks to client 108*a* after decrypting (and possibly de-tweaking and decompressing) the data blocks.

Data Deletion

The deletion of data will now be described. A deletion may be analogous in some ways to a write request. Data may be deleted from system 100 when a client address in which the data is stored is overwritten with other data or when a client address becomes invalid (e.g., a file or object is deleted). However, because there is not necessarily a 1:1 mapping between client addresses and stored data blocks (e.g., because there are multiple client addresses that have the same data block referenced by the same block identifier), system 100 may make sure that data is only deleted when it is no longer needed. For example, a data block should not be deleted if it is being referenced by another client address. However, in some embodiments (e.g., if a tweak value is calculated based on a volume identifier and LBA such that there is a 1:1 mapping between client addresses and stored data blocks), the standard write procedure described above with respect to FIGS. 4a and 4b may be used to delete or otherwise edit data blocks.

Block servers 112 may not know which clients 112 are referencing the data blocks. This is because metadata server 110 is used to abstract the client addresses. In such a scenario, block servers 112 cannot remove an overwritten or deleted block because block servers 112 do not know if other clients 108 are using this data block. Because metadata server 110 knows which data blocks are in use by client 108, block servers 112 and metadata servers 110 need to efficiently communicate to determine which data blocks are in use and which are not in use. "In use" means a data block is currently referenced by a client 108 and "not in use" means a data block is not referenced by any clients 108.

Different methods may be used to perform the deletion. One method for tracking which data blocks can be deleted is referred to as "garbage collection." Garbage collection is where an algorithm periodically runs to identify data that is no longer needed and then deletes the no long needed data.

One method of garbage collection may be a mark and sweep method that involves block servers 112 first marking all of their current block identifiers using a marker that indicates a block is "not in use". This may be an indication that the data block is not being used. Next, each metadata server 110 sends a list of the block identifiers that are currently valid (stored at valid client addresses) to block servers 112. Each list may only contain the block identifiers that correspond to each block server 112. Each block server 112 then marks each data block in the list as "in use". Once all the lists have been processed, block server 112 can remove any data blocks whose block identifiers are still marked as "not in use" because these data blocks are no longer being referenced by any client addresses. Any blocks that are written during the garbage collection process may automatically be marked as "in use" so they are not removed at the end of the process. This process removes the data blocks; however, it requires large lists of addresses to be communicated between metadata servers 110 and block servers 112. This may cause significant overhead if communication occurs over a LAN or WAN network. This system can be used according to the embodiments disclosed herein where data is encrypted, compressed, and/or tweaked before it is stored on block servers 112.

Figures 6A, 6B:
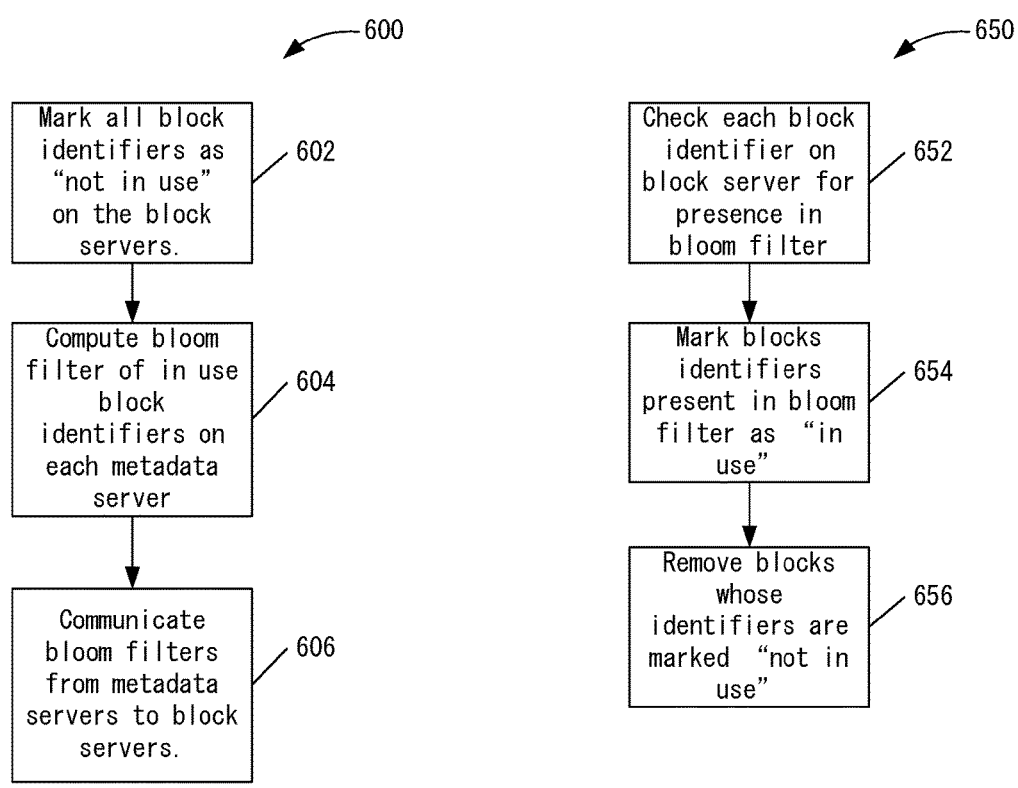
FIG. 6a depicts a flow diagram of a method for computing a Bloom filter at a metadata server in accordance with an illustrative implementation.
FIG. 6b depicts a flow diagram of a method for processing a Bloom filter at a block server in accordance with an illustrative implementation.

Other modes of garbage collection may also be used. For example, a method of garbage collection may be referred to as a Bloom filter mark and sweep. FIGS. 6a and 6b depict methods for performing a Bloom filter mark and sweep method according to one embodiment. The methods use a filter, such as a Bloom filter, to reduce an amount of data that is communicated between metadata servers 110 and block servers 112. Although a Bloom filter is discussed, other filters may be used. A Bloom filter is a type of bit field that may be used for membership testing. A Bloom filter is a compact representation of a set of data that can be used to later test for the presence of individual elements. For example, the elements A, B, C, and D may be represented in a Bloom filter. Block server 112 can test whether any of the elements are in the Bloom filter. However, the Bloom filter may not be used to generate the list of elements A, B, C, and D.

In exchange for the reduction in size, a small possibility of an error may be introduced. For example, a small percentage chance exists that an element may appear to be present when it is in fact not. This chance of error may be controlled by selecting a size for the Bloom filter based on a number of possible elements that can be stored on block server 112. Additionally, an error may not be fatal because the result of the error is that an element will just not be deleted when it is actually "not in use". Accordingly, an error in which a data block is deleted when it is still being referenced by client 108 does not occur.

FIG. 6a depicts a simplified flowchart 600 of a method for computing a Bloom filter at metadata server 110 according to one embodiment. In alternative embodiments, fewer, additional, and/or different steps may be performed. Also, the use of a flow diagram is not meant to be limiting with respect to the order of steps performed. At an operation 602, block servers 112 mark all data block identifiers as "not in use". At an operation 604, each metadata server 110 computes a Bloom filter for in-use block identifiers. A single Bloom filter that includes all metadata on metadata server 110 for all block servers 112 might be computed. Also, multiple Bloom filters for subsets of metadata on metadata server 110 for each block server 112 may be computed. The more metadata that is encompassed by the Bloom filter, the larger the Bloom filter is, which requires more memory and more network bandwidth to transmit. When multiple Bloom filters are used, such as one Bloom filter for each block server 112 or multiple Bloom filters for each block server 112, Bloom filters may be constructed serially or in parallel. Constructing Bloom filters in parallel may require more memory, but reduces the number of times metadata is read to build the Bloom filters. Similarly, combining Bloom filters before processing on block server 112 allows for fewer passes through the list of data blocks on block server 112, but may require larger Bloom filters and more memory.

At an operation 606, each metadata server 110 communicates a Bloom filter containing the valid block identifiers for a specific block server 112 to that block server 112. For example, each block server 112 may reference a range of block identifiers. Metadata server 110 may compute a Bloom filter for data block identifiers in each range. A Bloom filter is then sent to each respective block server 112. In another embodiment, a Bloom filter for the entire range of data block identifiers may also be computed and sent to each block server 112.

FIG. 6b depicts a simplified flowchart 650 of a method for processing a Bloom filter at block server 112 according to one embodiment. In alternative embodiments, fewer, additional, and/or different steps may be performed. Also, the use of a flow diagram is not meant to be limiting with respect to the order of steps performed. Although the method is described with respect to one block server 112, the method may be performed by multiple block servers 112. At an operation 652, a block server 112 checks each block identifier present on the block server against the received Bloom filter.

At an operation 654, if the Bloom filter indicates the block identifier is in use, block server 112 marks the block identifiers as "in use". Block server 112 may perform this check individually for each Bloom filter from each metadata server 110, or block server 112 can combine the Bloom filters (using a standard OR method) and perform the check against combined filters at one time.

At an operation 656, block server 112 removes any data blocks whose block identifier is still marked "not in use" because they are no longer referenced by any client address. Any blocks written during the garbage collection process may automatically be marked as "in use" so they are not removed at the end of the process.

In one example, Bloom filters for each block server 112 may be constructed in parallel on metadata server 110. The amount of metadata contained in each filter may be limited. For example, a fixed Bloom filter size is selected (e.g., defined by available memory) and created for each block server 112. Metadata on metadata server 110 is processed and Bloom filters are updated with data block identifiers in the metadata. When each Bloom filter reaches the optimal threshold of bits set (e.g., 50%), the Bloom filter is sent to block server 112 and a new Bloom filter is started for that block server 112. Block servers 112 process each Bloom filter as the Bloom filter arrives rather than combining Bloom filters from multiple metadata servers 110.

The Bloom filter mark and sweep method reduces network communication bandwidth needed between metadata servers 110 and block servers 112. A small percentage chance that a block may be indicated as "in use" when it is no longer actually in use may occur, but a block will not be marked as "not in use" if the data block was actually still in use. Thus, the integrity of the data storage system is not at risk.

Bloom filters are useful because the filter may be used to represent block identifiers that are referenced by multiple client addresses once. Thus, even if a block identifier is associated with multiple client addresses, the block identifier can only be included once in the Bloom filter. This saves space, but also allows robust testing of whether a data block is in use. Also, the Bloom filter does not increase in size when multiple copies of the same block identifier are included, Another method of garbage collection may be tracking which data blocks can be deleted from the system using a reference count for each data block stored on block servers 112. Each time a given block identifier is written into a storage medium, a reference count for that data block is incremented (starting at 1 the first time a block identifier is written). When a data block is overwritten or deleted by client 108, a reference count is decremented until it reaches zero. At this point, no client addresses reference the block identifier and a corresponding block data may be deleted.

This method may operate in real time. For example, when a block is no longer needed, the data block can be immediately detected and deleted to free space for other data blocks. However, if any reference count is incorrectly incremented or decremented, a data block may either be deleted when it is still being referenced by a client 108 or not be deleted although it is no longer being referenced.

Garbage collection, like de-dupability, may be affected by particular tweaking and encryption key schemes. In other words, the less likely an identical data block of one or more clients is to be tweaked and encrypted the same, the less utility garbage collection will have. For example, if tweak values are applied on a per client basis, the garbage collection would be simplified in that it would only need to check whether data blocks are mapped to a single client, as two clients would not map to the same data block due to different tweak values. Other examples are contemplated using various encryption key schemes. Other examples are also contemplated where garbage collection could still run on a customer wide basis for a plurality of clients that are part of the same customer. In other words, if a tweak value and/or encryption scheme limits the effectiveness of a garbage collection, the garbage collection process can actually be simplified to decrease traffic and processes running between the metadata servers 110 and the block servers 112.

Redundancy

Data redundancy is provided to allow system 100 to continue operation in the event of a failure. One method is to have each storage medium 114 used by block servers 112 implement a local redundancy technology, such as redundant array of independent disks (RAID), to spread data over multiple storage media 114 to survive the failure of an individual storage medium. However, in some cases, this method may not survive the failure of an entire metadata server 112 or block server 112. The data redundancy is different from de-duplication in that block servers 112 may store a data block (or metadata) once on a storage medium 114 in response to a write from a client 108. The data block may be replicated using additional writes to other storage media 114 found in different block servers 112, different storage media 114 in the same block server 112, or a different server node or cluster altogether.

In one embodiment, for metadata servers 110, failures may be handled by replicating the metadata to one or more additional metadata servers 110. Thus, if one metadata server 110 fails, the additional copies of metadata may be used to continue accessing the data. Replication may be performed by client 102 or directly by metadata server 110 in a chained or fanned-out fashion. For example, client 102 may send multiple read/write requests to multiple metadata servers 110. Also, metadata servers 110 may replicate the write requests to other metadata servers 110.

For block servers 112*a*, replication may also be performed where each data block is replicated to one or more additional block servers 112. In this way, a block may always be read and/or written to even if a specific block server 112 is unavailable. The mapping from block identifiers to data blocks may take into account the amount of redundancy required and map a block identifier to multiple block servers 112 where the data block can be stored and retrieved. Replication may be performed by a client 108 writing to each block server 112 to enable the replication. Also, a replication may be performed from a block server 112 to another block server 112 in a chained or fanned-out fashion.

The above method of redundancy uses additional write commands to replicate data. Clients 108, metadata servers 110, and/or block servers 112 can thus perform the redundancy algorithm without modification of what commands are used. In other conventional methods, such as RAID, a RAID controller or specialized RAID software is needed. Also, in RAID, multiple copies of data are mirrored between storage devices inside the same system, or a parity system is used to spread the data between multiple storage devices in the same system. Particular embodiments store multiple copies on different block servers 112 on different physical machines, increasing the recoverability in case of entire system failure.

Another method that can be used to handle block server failure is the use of an erasure code, such as a Reed-Solomon code, to spread the data for a single block across multiple block servers in such a way that even if a single block server 112 is unavailable, the data from other block servers 112 can be used to reconstruct the original data block. For example, the code may be used to recover the data from a failed block server 112. This method may require less data storage space allowing for a configurable amount of redundancy.

Advantageously, the systems and methods disclosed herein offer improved security for redundancy operations. According to an illustrative embodiment, all the data blocks in block servers 112 are encrypted (and may also be tweaked and/or compressed). In this embodiment, the data blocks are only decrypted by the metadata servers 110, as disclosed herein. Thus, the data blocks on the block servers 112 are dumb storage: they cannot be read in their present form without decryption at the metadata servers 110. Accordingly, during a redundancy operation, when transferring data blocks between block servers 112, the data blocks can remain encrypted or dumb. This increases security of the system because data that is being backed up remains encrypted. This may be of particular value if data being backed up passes over networks or backup servers are in different physical locations than the block servers 112. Additionally, redundancy operations can be performed by the block servers 112 without them contacting the metadata servers 110, or another location where encryption keys and/or tweak value schemes are stored or administrated.

Figure 7:
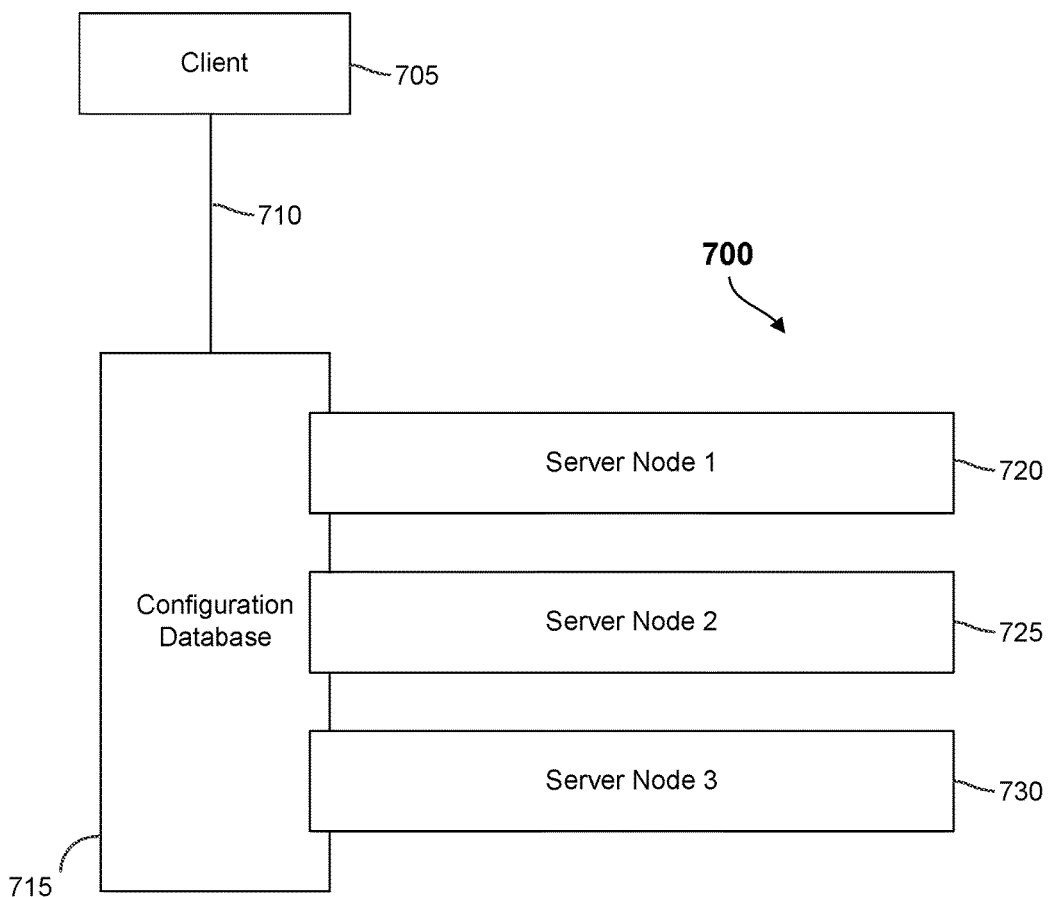
FIG. 7 depicts an example of a storage system with a configuration database in accordance with an illustrative implementation.

FIG. 7 depicts an example of a storage system 700 with a configuration database in accordance with an illustrative implementation. The storage system 700 includes a client 705 that can send requests to read, write, delete, etc. data. The client 705 is connected to a configuration database 715 through a network connection 710. The network connection 710 may include storage area network (SAN), a fibre channel (FC) connection, an Ethernet connection, or any other suitable network connection. The configuration database 715 may be configured to store and administration encryption keys and/or tweak value information for data stored on any of server nodes 1 (720), 2 (725), or 3 (730). The server nodes 1, 2, and/or 3 may each be servers as depicted in and described herein with respect to FIGS. 1 and 3. The metadata servers of the server nodes perform encryption, decryption, tweaking, and de-tweaking of data blocks stored thereon.

As disclosed herein, the decryption keys and tweak values (or tweak value rules) may be stored on metadata servers (such as those in server nodes 1, 2, and/or 3). In such an embodiment, the decryption keys and tweak values (or tweak value rules) may be administrated by a configuration database. That is, the configuration database 715 may determine the encryption and tweak schemes that will be used by the server nodes and update the metadata servers of the server nodes accordingly. In this way, an administrator may update the settings for encryption and/or tweaking via the configuration database 715 without having to manually update each and every server node or metadata server.

As disclosed herein, both encryption and tweak schemes can be configured or customized in different ways to take advantage of different advantages of various schemes or adjust to a customer/client need. Various encryption key and tweak settings that could be set by an administrator are also contemplated. Such settings include, but are not limited to: preventing a client/tenant and/or customer from utilizing encryption; requiring a client/tenant and/or customer to utilize encryption; encryption for client/tenant and/or customer is optional; require a per-client/tenant/volume encryption key; require a per-customer encryption key; require a global encryption key; or any combination of the preceding options. Similarly, an administrator may set optional, required, or prevented tweak settings or schemes via the configuration database 715.

Furthermore, additional customization and configuration is possible with a configuration database. As disclosed above, the configuration database 715 can merely store and administrate encryption and tweaking schemes for the server nodes. In another embodiment, various rules or keys may not ever be stored on a server node. Instead the server nodes may call into the configuration database 715 when data is to be encrypted, decrypted, tweaked, and/or de-tweaked so that the server node can determine what values, keys, schemes, etc. to use. The configuration database can further, with its knowledge of various encryption and tweaking settings for various clients, customers, metadata servers, and/or server nodes, administrate other functions of the server nodes as disclosed herein. For example, de-duping, redundancy, and or deletion procedures may be automatically or manually updated by the configuration database based 715 based on encryption and tweak settings for various nodes, metadata servers, clients, and/or customers. Overall, this yields a highly customizable and flexible system that can meet a wide variety of constraints or uses.

Other policies administrated by a configuration database 715 are also contemplated. For example, a key management policy may require that any encryption keys must be stored off the server nodes and configuration database 715 (e.g., stored at a client/customer device). Off network keys may also be a required setting implemented by an administrator. Where the keys are stored off network, a server node may query the device storing the off network key and store the key in random access memory (RAM) as it is being used. Another policy that may be implemented is utilizing an encryption key that is used to access/decrypt all the encryption keys used for a system. Such a master encryption key may also have settings for who can access and use the master encryption key. In such an embodiment, the master key and the other keys may be stored in different locations (e.g., normal keys in the configuration database 715 and the master key in an off network key management location). Any number of subordinate keys may be set up so that a metadata server may require access to two or more components of the system 700 (including additional off network locations) in order to decrypt particularly sensitive data. In another embodiment, the keys may be apportioned such that a server node would need to access a key in the configuration database and three of five (for example) key management servers in order to access the keys necessary to decrypt a data block. In this way, if a key management server goes down, the system is still operational. In this way, the system can be further customized to offer more or less security and different configurations as desired. A network setting may also require that encryption keys be periodically checked or verified. The verification may determine whether they are valid and/or whether they are being used. Invalid keys or keys that have not been used for a long time may be removed or forgotten from the system.

Figure 8:
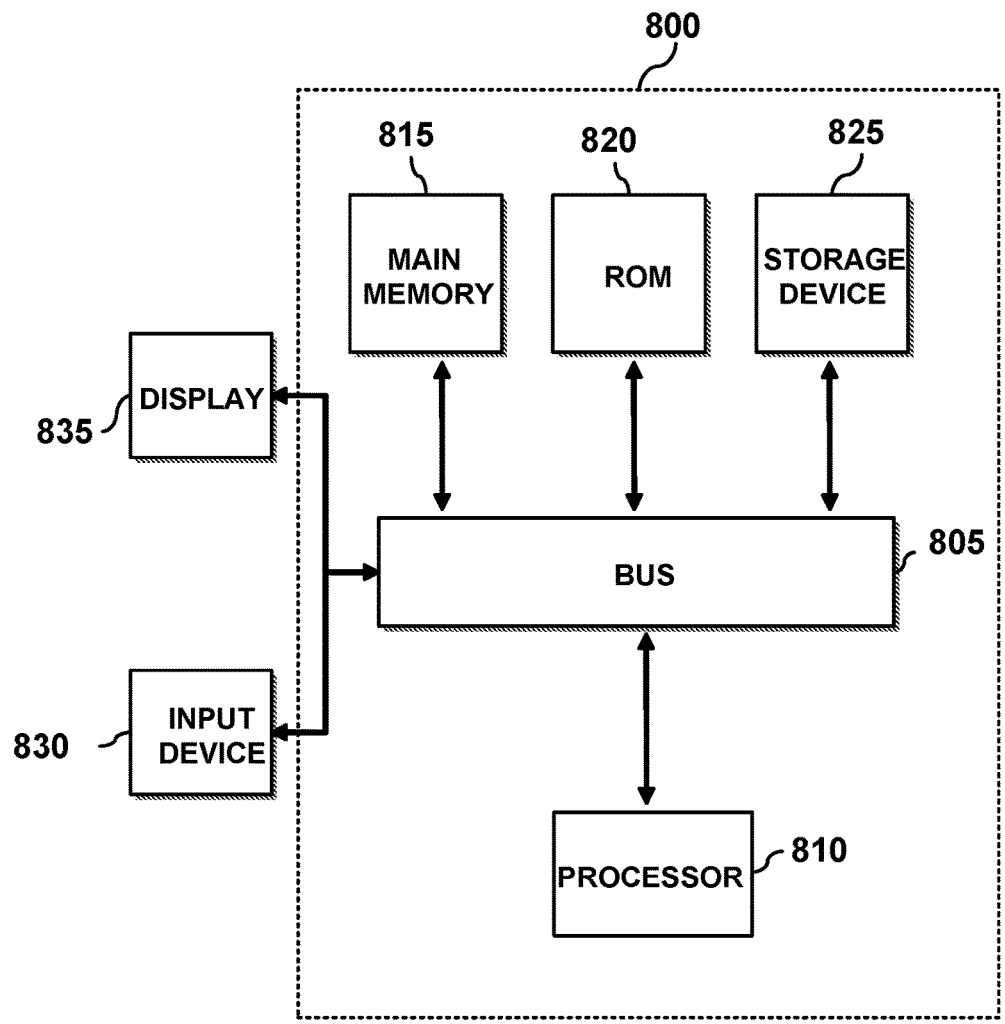
FIG. 8 depicts a block diagram of a computer system in accordance with an illustrative implementation.

FIG. 8 is a block diagram of a computer system 800 in accordance with an illustrative implementation. The computing system 800 includes a bus 805 or other communication component for communicating information and a processor 810 or processing circuit coupled to the bus 805 for processing information. The computing system 800 can also include one or more processors 810 or processing circuits coupled to the bus for processing information. The computing system 800 also includes main memory 805, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

According to various implementations, the processes described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an example computing system has been described in FIG. 8, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A server node comprising:
   a processor; and
   a computer-readable medium having program code stored therein, the program code executable by the processor to cause the server node to, based on receipt of a request from a client: write data to a storage volume, compress the data;
   calculate a first tweak value based on identification of the storage volume; vary the compressed data according to the first tweak value; select one of a plurality of encryption schemes based on the request, wherein the selected encryption scheme uses an encryption key stored on the server;

encrypt the compressed, varied data according to the encryption key to yield compressed, varied and encrypted data to prevent identification of the data by unauthorized decryption from another client;

hash the compressed, varied and encrypted data to yield one or more hash values as one or more block identifiers; and communicate the compressed, varied and encrypted data to a set of one or more server nodes based, at least in part, on the one or more block identifiers for the set of one or more server nodes to store the compressed, varied and encrypted data.

2. The server node of claim 1, wherein the identification of the storage volume is based on an address of the client.

3. The server node of claim 1, wherein the program code to cause the server node to calculate the first tweak value based on the storage volume identification further comprises program code executable by the processor to cause the server node to calculate a second tweak value based on a logical block address included in the request from the client to write data.

4. The server node of claim 1, wherein the encryption key is associated with one of a client address from which the request was received, an identifier of the storage volume, a tenant associated with the request, and a customer account associated with the request.

5. The server node of claim 1, wherein the program code further comprises program code executable by the processor to cause the server node to vary the compressed data before encryption.

6. The server node of claim 1, wherein the program code to vary the compressed data comprises program code executable by the processor to cause the server node to:
determine from metadata maintained at the server node a data variation scheme for varying the compressed data based, at least in part, on the request; and
vary the data with a second tweak value corresponding to the determined data variation scheme.

7. The server node of claim 6, wherein the program code to determine the data variation scheme comprises program code executable by the processor to cause the server node to select a second tweak value from a plurality of tweak values based on one of a tenant corresponding to the request and a customer account corresponding to the request.

8. The server node of claim 6, wherein the program code to determine the data variation scheme comprises program code executable by the processor to cause the server node to calculate the second tweak value from an address of the client.

9. A method comprising:
segmenting data in transit at a first server into one or more data blocks;
compressing the one or more data blocks;
calculating a tweak value based on identification of a volume associated with the data;
varying the one or more compressed data blocks according to the tweak value;
selecting one of a plurality of encryption schemes based on the request, wherein the selected encryption scheme uses an encryption key stored on the first server;
encrypting the one or more compressed, varied data blocks to yield one or more encrypted data blocks to prevent identification of the data blocks by unauthorized decryption;
hashing the one or more encrypted data blocks to generate block identifiers; and
requesting a set of one or more servers to store the one or more encrypted data blocks based, at least in part, on the block identifiers.

10. The method of claim 9, wherein encrypting the one or more compressed, varied data blocks at the first server is distinct from at rest encryption performed by the set of one or more servers on the one or more data blocks.

11. The method of claim 9 wherein identification of the volume associated with the data is based on an address of a client sending the data.

12. The method of claim 9 further comprising:
based on receipt of confirmation at the first server from a first of the set of one or more servers that a first of the one or more encrypted data blocks has been stored, updating metadata that maps client data addresses to block identifiers with a mapping of the client data address to a first of the block identifiers that identifies a first encrypted data block.

13. The method of claim 9 further comprising varying the one or more compressed data blocks before encrypting.

14. The method of claim 9, wherein varying the one or more compressed data blocks comprises:
determining from metadata maintained at the first server a data variation scheme based, at least in part, on one of a customer account and a tenant; and
varying the one or more compressed data blocks according to the determined data variation scheme.

15. The method of claim 10, further comprising:
in response to deletion of a first of the one or more data blocks, performing garbage collection limited to checking blocks on the volume that are associated with a client.

16. The method of claim 14, wherein a customer associated with the customer account includes the tenant.

17. A non-transitory computer-readable medium having program code for encrypting data in transit, the program code comprising instructions to:
based on receipt of a client request at a first server to write data to a storage volume, compress the data;
calculate a tweak value based on an identification of the storage volume;
vary the data according to the tweak value;
select one of a plurality of encryption schemes based on the client request, wherein the selected encryption scheme uses an encryption key stored on the first server;
encrypt the compressed, varied data according to an encryption key to yield compressed, varied and encrypted data to prevent identification of the data by unauthorized decryption from another client;
hash the compressed and encrypted data to yield one or more hash values as one or more block identifiers; and
communicate the compressed and encrypted data to a set of one or more server nodes based, at least in part, on the one or more block identifiers for the set of one or more server nodes to store the compressed and encrypted data.

18. The non-transitory computer-readable medium of claim 17, wherein the volume identification is based on an address of the client.

19. The non-transitory computer-readable medium of claim 17, wherein the program code instructions to calculate the tweak value further comprises instructions to calculate the tweak value based on a logical block address included in the client request.

* * * * *